United States Patent [19]

Browne

[11] 4,411,417
[45] Oct. 25, 1983

[54] BOTTOM SHEET FEEDING APPARATUS

[75] Inventor: John M. Browne, Victor, N.Y.

[73] Assignee: Xerox Corporation, Stamford, Conn.

[21] Appl. No.: 317,212

[22] Filed: Nov. 2, 1981

[51] Int. Cl.³ ............................................. B65H 3/12
[52] U.S. Cl. ..................................... 271/94; 271/98; 271/99; 271/35; 271/165
[58] Field of Search ..................... 271/94, 98, 99, 35, 271/145, 165, 166

[56] References Cited

U.S. PATENT DOCUMENTS

| | | | |
|---|---|---|---|
| 2,817,519 | 12/1957 | Beck | 271/29 |
| 3,424,453 | 1/1969 | Halbert | 271/35 |
| 3,782,716 | 1/1974 | Long et al. | 271/99 |
| 3,844,551 | 10/1974 | Morrison | 271/99 |
| 4,313,599 | 2/1982 | Lohr | 271/166 |

OTHER PUBLICATIONS

Xerox Disclosure Journal, vol. 2, No. 4, p. 53, Jul./Aug. 1977, "Paper Casette", J. David Modrak et al.

Primary Examiner—Richard A. Schacher

[57] ABSTRACT

A bottom sheet feeding apparatus including a sheet separator and feeder and a sheet stacking tray which has a planar base portion defining a base plane, the front of the base portion having an opening within which said bottom sheet separator is positioned, the tray further including two sloping planar side wings, one at each side of said opening in the base portion. The sloping planar side wings are angled upward from the base plane and are angled outward from front to rear of the tray and intersect the base plane such that the intersection at the rear of the tray is in the approximate location of the rear corners of a rectangle the size of a sheet to be fed and the intersection of the planar wings and the base plane at the front of the tray is approximately midway between the front corners of a sheet to be fed and the centerline of a sheet to be fed. In a preferred embodiment the sheet separator feeder comprises a plurality of vacuum belts having a vacuum plenum disposed within the run of the belts.

11 Claims, 10 Drawing Figures

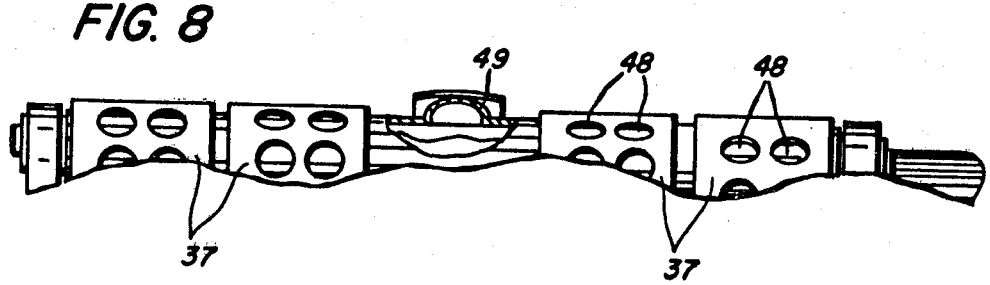

BOTTOM SHEET FEEDING APPARATUS

REFERENCE TO RELATED APPLICATIONS

Reference is hereby made to copending application Ser. No. 317,219, entitled SHEET FEEDING APPARATUS in the name of Gerald M. Garavuso filed concurrently herewith and to Ser. No. 317,211, entitled SHEET FEEDING APPARATUS in the name of John M. Browne also filed concurrently herewith.

BACKGROUND OF THE INVENTION

The present invention relates to sheet feeding apparatus and in particular to a tray on which sheets are stacked for use with a bottom vacuum corrugating feeding apparatus.

With the advent of high speed xerographic copy reproduction machines wherein copies can be produced at a rate in excess of three thousand copies per hour, the need for a document handler to feed documents to the copy platen of the machine in a rapid, dependable manner was recognized to enable full utilization of the reproduction machine's potential copy output. A number of document handlers are currently available to fill that need. These document handlers must operate flawlessly to virtually eliminate the risk of damaging the originals and generate minimum machine shutdowns due to uncorrectable misfeeds or document multifeeds. It is in the initial separation of the individual documents from the document stack where the greatest number of problems occur.

Since the documents must be handled gently but positively to assure separation without damage through a number of cycles, a number of separators have been suggested such as friction rolls or belts used for fairly positive document feeding in conjunction with a retard belt, pad, or roll to prevent multifeeds. Vacuum separators such as sniffer tubes, rocker type vacuum rolls, or vacuum feed belts have also been utilized.

While the friction roll-retard systems are very positive, the action of the retard member; if it acts upon the printed face can cause smearing or partial erasure of the printed material on the document. Wih single sided documents, this does not present a problem as the separator can be designed so that the retard mechanism acts upon the underside of the document. However, with documents printed on both sides, there is no way to avoid the problem. Additionally, the reliable operation of friction retard feeders is highly dependent on the relative frictional properties of the paper being handled. This cannot be controlled in a document feeder.

In addition, a typical vacuum separating and feeding system is that described in Ser. No. 81,594 entitled "Sheet Separator" to Hamlin, wherein a plurality of friction belts is arranged to run over a vacuum plenum placed at the bottom of a sheet supply tray which has a "U" shaped pocket formed in it. The pocket serves to provide space for the bottom sheet to be captured by the vacuum feed belt assembly, to provide an air seal between the bottom document and the edges of the pocket and to provide a high pressure seal between the bottom sheet and the remainder of the stack. This high pressure seal is achieved by supporting a major portion of the stack weight on the edge regions of the pocket. This seal serves to convert the velocity energy of the air knife flow into a lifting pressure over the pocket area to levitate the remainder of the stack of sheets. This configuration has been used on a commercial scale in the Xerox 5600 machine and while it has been highly successful in operation, certain aspects can be improved. The "U" shaped or parabolic arc pocket configuration does not permit deformation of the sheet in a geometrically developable shape. Instead, it buckles the sheet around the edges and provides a leakage path for air to escape from the interface between the bottom sheet and the rest of the stack of sheets. This results in a reduction in the degree of levitation of the stack. Because of the shape of the parabolic arc the pressure distribution under the stack is not as efficient as could be and therefore, for a given degree of levitation higher air knife pressure is necessary which results in larger capacity air blowers and more noise. Finally, the parabolic arc shape does not adjust to different size paper since it works efficiently only over the parabolic pocket. In particular, difficulty is sometimes encountered in trying to levitate a stack of sheets substantially larger than the parabolic pocket.

PRIOR ART

U.S. Pat. No. 3,424,453 (Halbert) illustrates a vacuum sheet separator feeder with an air knife wherein a plurality of feed belts with holes are transported about a vacuum plenum and pressurized air is delivered to the leading edge of the stack of sheets.

U.S. Pat. No. 3,844,551 (Morrison) illustrates a vacuum type sheet feeding device wherein a sheet is pulled by vacuum into a groove in the sheet support.

U.S. Pat. No. 3,782,716 (Long et al) illustrates a device for selecting data cards where the ends of the card are pulled down by a vacuum.

U.S. Pat. No. 2,817,519 (Beck) describes a vacuum sheet feeding device with a throat shaped opening in the sheet support tray.

SUMMARY OF THE INVENTION

It is an object of the present invention to provide an improved bottom sheet feeder.

It is a further object of the present invention to improve the efficiency of air usage in a bottom vacuum sheet feeder with an air injection means at the lead edge of the stack of sheets.

It is a further object of the present invention to improve the design of the tray on which the sheets are stacked to provide a better seal between the bottommost sheet and the remainder of the stack of sheets.

It is an additional object of the present invention to provide a bottom sheet feeder of improved reliability with a greater variety of paper weights, sizes and conditions.

It is an additional object of the present invention to provide a more efficient sheet feeder and in particular, a smaller, less noisy, less costly, lower power consuming air injection means.

These and other objects are attained with a bottom sheet feeding apparatus which includes a sheet separator feeder and a sheet supply tray which has a planar base defining a base plane, the front of the base portion having an opening within which the bottom sheet separator is positioned and the tray further including two sloping planar side wings, one on each side of said opening in the base portion. The sloping planar side wings are angled upward from the base plane and being angled outward from front to rear of the tray and intersecting the base plane such that the intersection at the rear of the tray is in the approximate location of the rear corners of a rectangle the size of a sheet to be fed, and the intersection of the planar wings and the base plane at the front of the tray is approximately midway between the front corners of a sheet to be fed and the centerline of a sheet to be fed. Typically the intersection of the planar side wings and the base plane is along a line from a point at the rear of the tray at the approximate location of the rear corners of a rectangle the size of a sheet to be fed to a point at the front of the tray midway between the front corners of a sheet to be fed and the centerline of the sheet.

In a specific aspect of the present invention the separator feeder comprises a plurality of vacuum belts having a vacuum plenum disposed within the run of the belts and an air injection means such as an air knife which injects air pressure between the acquired bottommost sheet and the remainder of the stack.

For a better understanding of the invention as well as other objects and further features thereof, reference is made to the following drawings and description.

BRIEF DESCRIPTION OF THE DRAWINGS

FIG. 8 is an end view partially in section of the vacuum feed belt assembly illustrated in FIGS. 1, 2 and 6.

DESCRIPTION OF THE PREFERRED EMBODIMENT

The invention will now be described by reference to a preferred embodiment of the bottom sheet feeding apparatus.

Figure 1:
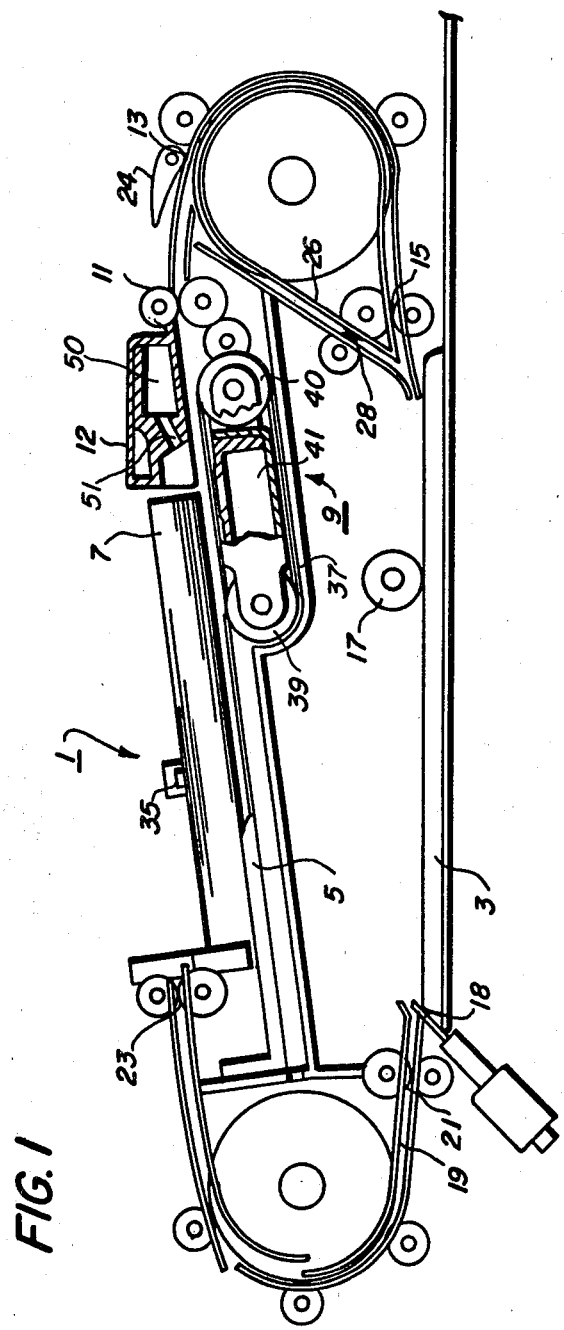
FIG. 1 is a cross sectional side view of an exemplary recirculating sheet feeder employing the present invention.

Referring particularly to FIG. 1, there is illustrated an exemplary automatic sheet separator feeder for installation over the exposure platen 3 of a conventional xerographic reproduction machine. This is merely one example of a document handler with which the exemplary sheet separator feeder may be combined. The document handler 1 is provided with a document tray 5 which will be described in greater detail later, adapted for supporting a stacked set of documents 7. A vacuum belt corrugating feeder mechanism 9 is located below the front or forward area of the document tray for acquiring and corrugating the bottom document sheet in the stack and for feeding out that document sheet to take-away roll pair 11 through document guides 13 to a feed-roll pair 15 and under platen roll 17 onto the platen of the copy machine for reproduction. A rectractable registration edge 18 is provided here to register the lead edge of the document fed onto the platen. Following exposure of the document, the edge 18 is retracted by suitable means such as a solenoid and that document is fed off the platen by roll 17 onto guide 19 and feed-roll pair 21 and returned back to the top of the document stack 7 through a feed-roll pair 23. Gross restacking lateral realignment is provided by an edge guide 60 (see FIG. 2) resettable to a standard sheet size distance from an opposing fixed edge guide 20. The "wing" on the guide 60 helps settle incoming (restacking) sheets between the two guides 20 and 60.

In the event it is desired to present the opposite side of a document for exposure, the document is fed from the stack 7 through guides 13 until the trail edge passes document diverter 24. Document diverter 24 is then rotated counterclockwise, i.e. into the document sheet path. The document direction is reversed and the document is diverted by divertor 24 through guides 26 and feed-roll pair 28 onto the platen 3.

The document handler 1 is also provided with a sheet separator finger 35 as is well known in the art, to sense and indicate the documents to be fed versus those documents returned to the document handler, i.e to count each set circulated. Upon removal (feed out) of the last document from beneath sheet separator finger 35, the finger 35 drops through a slot provided in the tray 5 to actuate a suitable sensor indicating that the last document in the set has been removed from the tray. The finger 35 is then automatically rotated in a clockwise direction or otherwise lifted to again come to rest on top of all the documents in the stack 7, for the start of the next circulation of document set 7.

Figure 2:
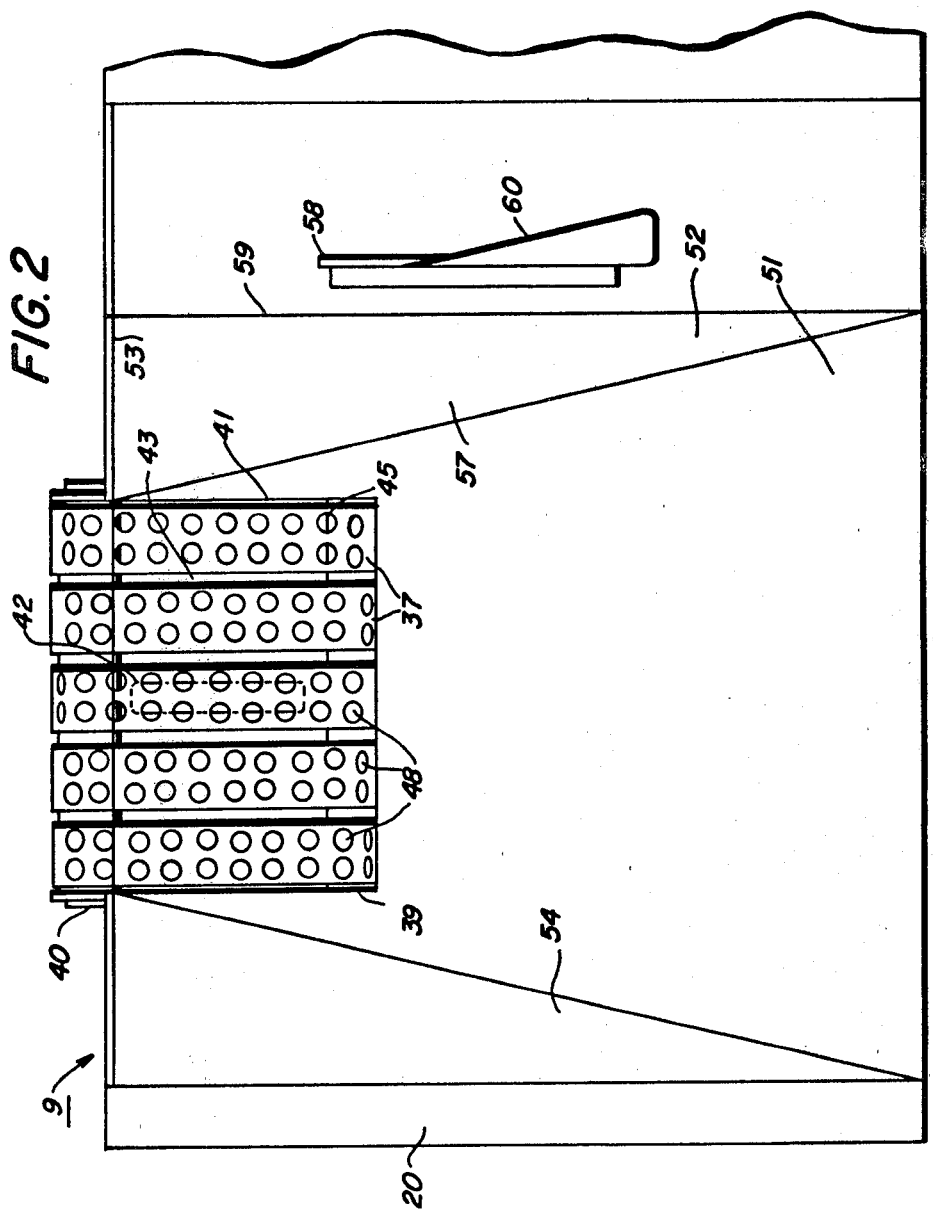
FIG. 2 is a plan view of the sheet separator feeder according to the present invention.

Referring more particularly to FIG. 2, and the document sheet separator-feeder 9, there are disclosed here a plurality of feed belts 37 supported for movement on feed belt rolls 39 and 40. Spaced within the run of the belts 37 there is provided a vacuum plenum 41 having openings 43 therein adapted for cooperation with perforations 45 in the belts 37 to provide a vacuum for pulling the bottom document in the document stack onto the belts 37. The plenum 41 is provided with a raised portion 49, as illustrated in greater detail in FIG. 8, beneath the center belt 48 run so that upon capture of the bottom document in the stack against belts 37, a center corrugation will be produced in the bottom sheet. This raised portion may project above the plane of the remainder of the belts by approximately 2 millimeters. Note also that the belts are preferably in the plane of the surrounding support surfaces. Thus the document is corrugated into a double valley configuration. The flat surfaces of the vacuum belts 37 on each side of the raised center belt 48 generates a region of stress on the document which varies with the document beam strength. In the unlikely event that more than one document is pulled down into contact with the vacuum feed belts, the beam strength of the second (overlying) document resists this corrugating action. Thus, gaps are opened between the first and second sheets, which gaps extend to the sheet lead edges. These gaps or channels reduce the vacuum pressure levels between these sheets due to porosity in the first (bottom) sheet and provide for entry of the separating air flow from the air knife 12.

The air knife 12 (see FIG. 1) is comprised of a pressurized air plenum 50 having a plurality of separated air jet openings or orifices 51 to inject air between the bottommost document pulled down against the feed belts and the documents in the stack thereabove to provide an air cushion or bearing between the stack and the bottom document to minimize the force needed for removing the bottom document from the stack. With the use of this air knife in conjunction with the above described bottom sheet corrugator, even if two documents are pulled down toward the belts 37, since the top sheet would not be corrugated, the air knife would inject air into the space between the two documents and force the second document off from the raised belt back toward the document stack.

As can be seen by reference to FIG. 2, the stack tray is designed such that the lead edge 53 of the sheets in the stack are spaced a slight distance from the front edge of the tray. Further, the air knife is canted as shown in FIG. 1 such that the air streams are discharged at an angle to the plane of the surface of the belts. With this disclosed interrelationship between the vacuum feed belts, the lead edge of the stack of sheets, and the air knife location and angular orientation, the document feeder is capable of reliably separating and feeding individual document sheets even if the sheets have some up-curl or down-curl.

By suitable valving and controls, it is also desirable to provide a delay between the time the vacuum is applied to pull the document onto the feed belts and the start up of the feed belts, to assure that the bottom document is captured on the belts before belt movement commences and to allow time for the air knife to separate the bottom sheet from any sheets that were pulled down with it.

To further increase the efficiency of the system, the stack tray is provided with a rearward tilt as shown in FIG. 1. When flotation air is provided under the stack or between the first and second sheets, gravity will allow the sheets to settle or float back against the rear tray wall. Thus, the sheet being removed is pulled uphill while gravity helps hold the remainder of the sheets back, helping to prevent multifeeds, and providing alignment or initial end registration of the stack 7 on one axis (in the feeding direction).

Figure 3:
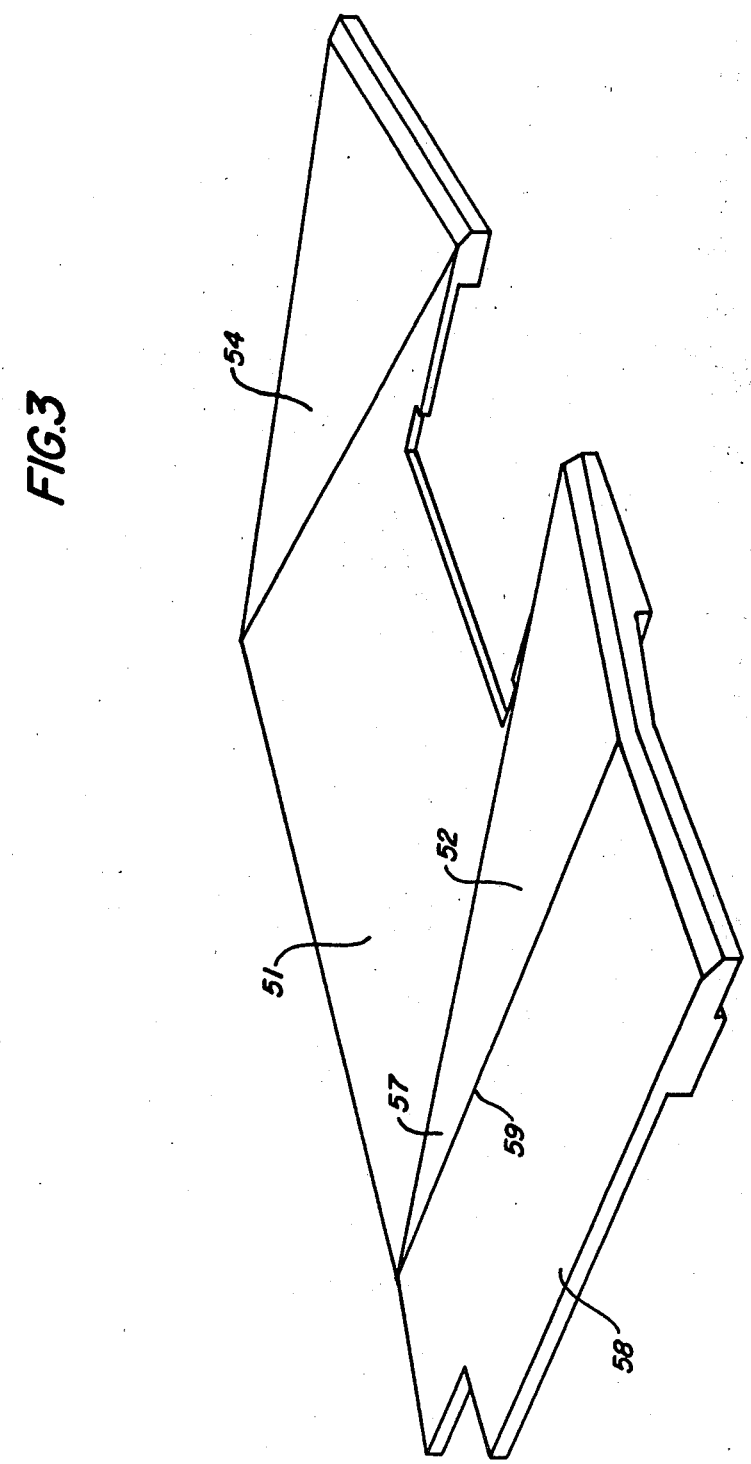
FIG. 3 is an isometric view of the sheet stacking tray according to the present invention.

With continued reference to FIG. 2 and particular reference to FIG. 3, the sheet stacking tray 5 will be described in greater detail. The sheet stacking tray in its simplest form comprises a planar base portion 51 which defines a base plane and has an opening at its front end and where the vacuum corrugated separator feeder may be inserted. The tray further includes two sloping planar side wings 52 and 54 which intersect the base plane. The planar side wings are positioned at a small acute angle $\theta$ of from about 3 degrees to about 6 degrees relative to the base plane as may be more clearly seen from the section of FIG. 5 taken along the line CC depicted in FIG. 5C. In addition, the planar side wings are angled outward from front to rear and are so located that for a nominal size sheet to be separated and fed that they intersect the base plane at the rear of the tray in the general location of the rear corners of a rectangle the size of the nominal sheet to be fed. The intersection of the planar side wings and the base plane at the front is in the general location midway between the front corners of a nominal sheet to be fed and the centerline of the sheet. The three planes form a pocket with an opening at the front of the stack in which the sheet separator feeder mechanism may be inserted and through which air may be injected by the air knife to levitate the stack. In operation the vacuum plenum is energized and the bottommost sheet is sucked down onto the feed belts and captured. The air knife injects pressurized air toward the bottommost sheet of the stack which may already be slightly separated from the remainder of the stack and forces air between the bottommost sheet in the stack and the remainder of the stack.

The objective of the tray design is to form an efficient aerodynamic bearing between the bottommost sheet and the remainder of the stack to reduce friction between the bottommost sheet and the next sheet and enable much easier feeding of the separated sheet. This is accomplished with the present tray since a pocket is formed between the bottommost sheet and the remainder of the stack when the bottommost sheet is captured by the plenum chamber which geometrically develops the sheet by bending only without buckling and thereby forms a seal around the two sides and rear of the tray between the bottommost sheet of a stack and the remainder of the stack. The pocket is formed by the planar side wings lifting the edges of the bottommost sheet against the rest of the stack which together with the opening at the front of the stack to enable injection of pressurized air forms an air bearing since air is forced into the pocket and forced to escape from the sides and rear of the sheet thereby levitating the remainder of the stack and separating it from the bottommost sheet. With the present configuration, the pocket is sealed around both sides and the rear to a very great degree which is desirable since high pressure provides the best levitation. High pressure cannot be achieved unless a good seal is formed. In addition, with the present design, the ratio of the opening between the bottommost sheet and the remainder of the stack at the rear of the tray to the opening between the bottommost sheet and the remainder of the stack at the front of the tray is relatively small and therefore the pressure is relatively large at the rear of the tray. This is because there is a gradual decrease in flow cross sectional area for air to escape from the sides and rear of the sheet and the decreasing distance between the top and the bottom of the flow path maintains a higher pressure closer to the outside edge of the sheet. This is in contrast to the parabolic pocket formed in the Hamlin application referred to above wherein a linear pressure drop is obtained since the flow path has parallel sides to it. In this way the specific configuration of the tray of the present invention assists in providing both acquisition of the bottom sheet by the sheet separator feeder and levitation of the remainder of the stack relative to the bottommost sheet. In the acquisition phase, the bottommost sheet is deformed initially only in a developable surface by which it is meant that it is to be constructed out of straight lines only with pure bending and no buckling. This minimizes the energy required to acquire the sheet by the vacuum plenum. Furthermore since the vacuum plenum acquires the sheet without buckling, the bottommost sheet does not contort in a manner to destroy the seal at the edges around the two sides and the rear as may occur in the above referenced Hamlin application. As a result, the planar side wings tend to be insensitive to sheet stiffness because it is relatively easy to deform by bending the sheets into geometric surfaces whereas it is comparatively difficult to buckle sheets.

While the planar base portion and the two planar side wings may intersect at a line, it is preferred that this line be rounded by a radius to form a smoother surface and thereby maintain a better seal for the paper in contact with the tray at the area of intersection. This enables the formation of a better air bearing between the tray and the bottommost sheet and also between the bottommost sheet and the remainder of the stack.

The configuration of the tray has been described with reference to the size of a nominal rectangular sheet of paper which it is desired to feed. By arranging the size of the tray so that the planar side wings are angled outward from the front to the rear of the tray and intersect the base plane at the rear of the tray in the location of the rear corners of a rectangle the size of a sheet to be fed and also intersect at the front of the tray at approximately midway between the front corners of a sheet to be fed and the centerline of a sheet to be fed, maximum reliability may be achieved. However, it is possible that with any given sheet feeding apparatus sheets of more than one size may be desired to be fed. The present apparatus provides a relatively large operational window of sheet sizes in which it will work very effectively. Thus, for the selection of the particular tray configuration the particular paper sizes desired to be fed are identified and the usage factors for the various sizes are identified and the tray configuration is then picked for the overall performance desired taking into account all sizes of sheets to be fed. In this way it has been found that the same tray may be used to effectively feed sheets in size ranging all the way from $8 \times 10$ or B5 to $11 \times 17$ or B4.

Figure 4:
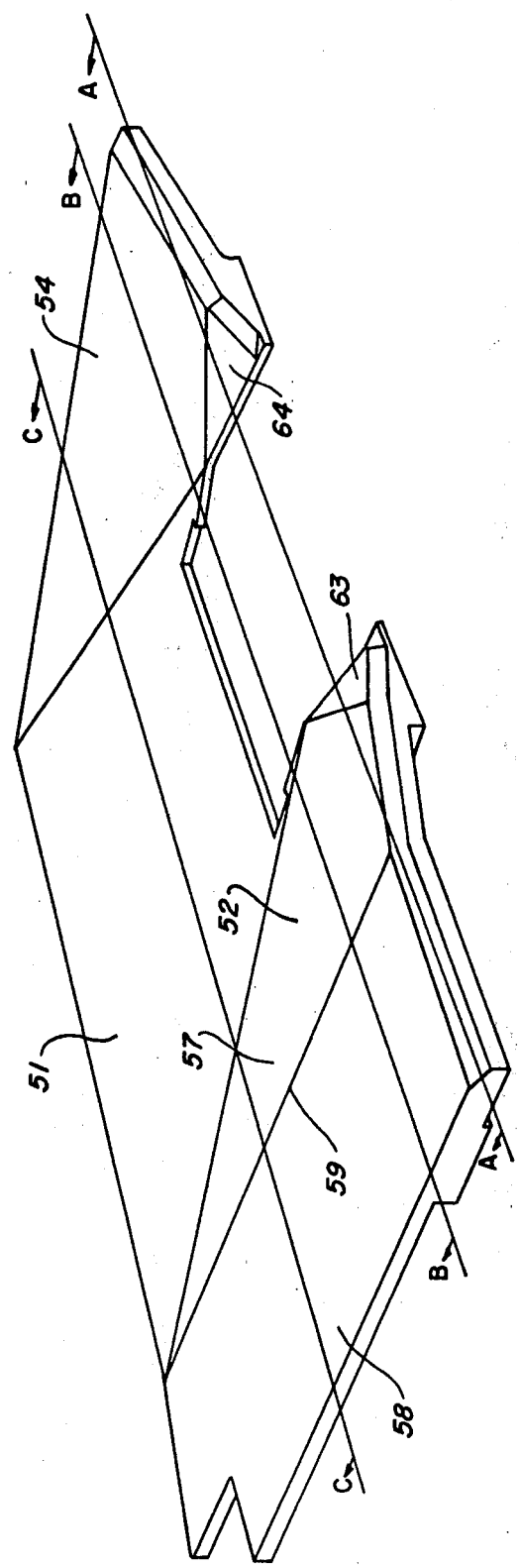
FIG. 4 is an isometric view of a preferred embodiment of the sheet stacking tray according to the present invention.
Figure 5A:
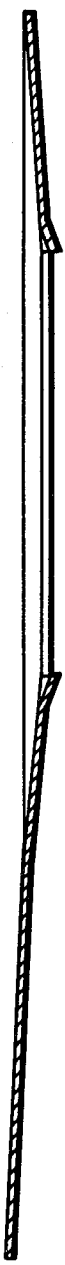
FIGS. 5A, 5B, and 5C are sectional views of the sheet stacking tray of FIG. 4 taken along the lines AA, BB, and CC.
Figure 5B:
Figure 5C:
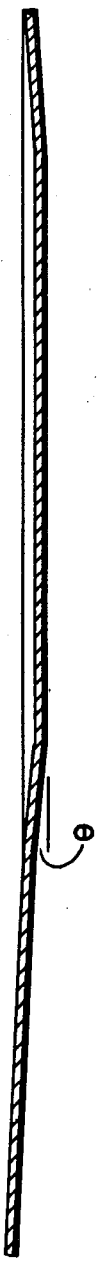

With regard to the angle $\theta$ of the wings relative to the base plane as illustrated in FIGS. 4 and 5, this angle should be selected based on a compromise between various sheet conditions, weights, stiffnesses and the air knife flow. Typically the angle $\theta$ may be from about 3 degrees to about 6 degrees in providing effective separation and feeding for a wide range of commonly used sheet weights and stiffness.

With particular regard to oversized sheets, attention is once again directed to FIG. 3 wherein it is noted that sloping planar side wing 52 is broken into two planes, a first planar portion 57 and a second planar portion 58 which intersect along line 59. By breaking the planar side wing in such a way, an oversized sheet of paper can be further geometrically bent at the end of its oversize dimension to enable the sheet to be fed through the same sheet feed throat or nip. In this configuration, the angle with which a first planar portion 57 meets the base plane is the angle $\theta$ and as may be seen to reference to FIG. 3, the second planar portion is bent relative to the first planar portion to a more horizontal configuration or rather, to a plane more parallel relative to the base plane. In this configuration the angle formed between the second planar portion and the base plane if the second planar portion were extended to the base plane, would be smaller than the angle $\theta$ and of the order of from about 2 degrees to about 4 degrees.

Figure 6:
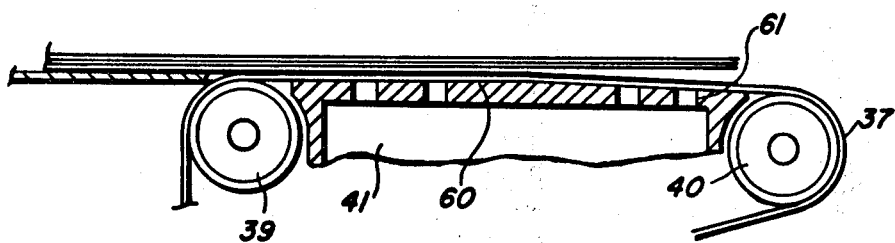
FIG. 6 is a cross sectional view of a preferred sheet feeding apparatus for use with the sheet stacking tray according to the present invention.

In a particularly preferred embodiment of the bottom sheet feeding apparatus of the present invention the sheet stacking tray is further modified and is used with a modified vacuum plenum chamber and belt transport assembly. The vacuum plenum chamber and belt transport assembly is that which is described in my copending application Ser. No. 317,211, entitled Sheet Feeding Apparatus and filed concurrently herewith and hereby incorporated by reference herein. Essentially the vacuum plenum chamber and belt transport assembly are modified to provide two slopes as illustrated in FIG. 6, the rear portion 60 in the plane of the base plane and the front portion 61 angled clockwise or down slightly with respect to the base plane. Since the bottommost sheet is already captured by the vacuum plenum by pulling its leading edge down slightly it serves to assist in separating the leading edge of the bottommost sheet from the remainder of the stack. The angling down clockwise of the vacuum plenum chamber and belt assembly provides a bidirectional corrugation to the bottom sheet by virtue of its bending along a line perpendicular to the feeding direction after having already been bent by the planar sloped wings in two directions roughly parallel to the feeding direction. This provides a good separation of the bottommost sheet from the stack since the bottommost sheet is captured and bent in a direction which the second sheet does not wish to follow. By pulling the leading edge of the bottommost sheet down it is stretched and the second sheet resists the bending and stretching and tends to break any bond that may be present between the bottommost sheet and the second sheet thereby is separated from the bottommost sheet. The front of the plenum may be bent at any suitable angle to the rear of the plenum. Ideally a greater angle should provide better separation but there is a limit to the amount that sheets can be stretched which is dependent on the vacuum level and various characteristics of the sheet such as stiffness and condition. Typically, the front portion of the plenum is bent clockwise from the rear portion of the plenum on angle of from about 2° to about 8°. The angle is sufficient to separate the bottommost sheet from the stack but not too large to cause excessive buckling in the sheet. Particularly satisfactory results with a wide range of sheet types may be achieved with an angle of about 3° to about $3\frac{1}{2}°$. Since the plane of the bottommost sheet as it is now fed forward has been altered downwardly the sides of the sheet should be permitted to also slope downwardly. Accordingly two small downwardly sloped planar transition wings 63 and 64 (see FIG. 4) are formed in the front of the tray adjacent the opening and the downward sloping section of the vacuum plenum and feed belt assembly. These transition wings intersect the planar sloping side wings beginning at a point adjacent the opening in the planar base portion where the transition in the slope of the vacuum plenum and feed belt assembly occurs and extends forwardly to the end of the tray. The transition wings may be described as the triangular portion of a plane in which one side lies in the plane of the downwardly sloped or angled portion of the plenum, a second side lies in the plane of the planar sloping side wings and a third side which forms part of the contour of the leading edge of the tray. These two comparatively small wings provide a transition path for the sheet being fed from the downslope of the plenum to the front wings of the plenum.

Figure 7:
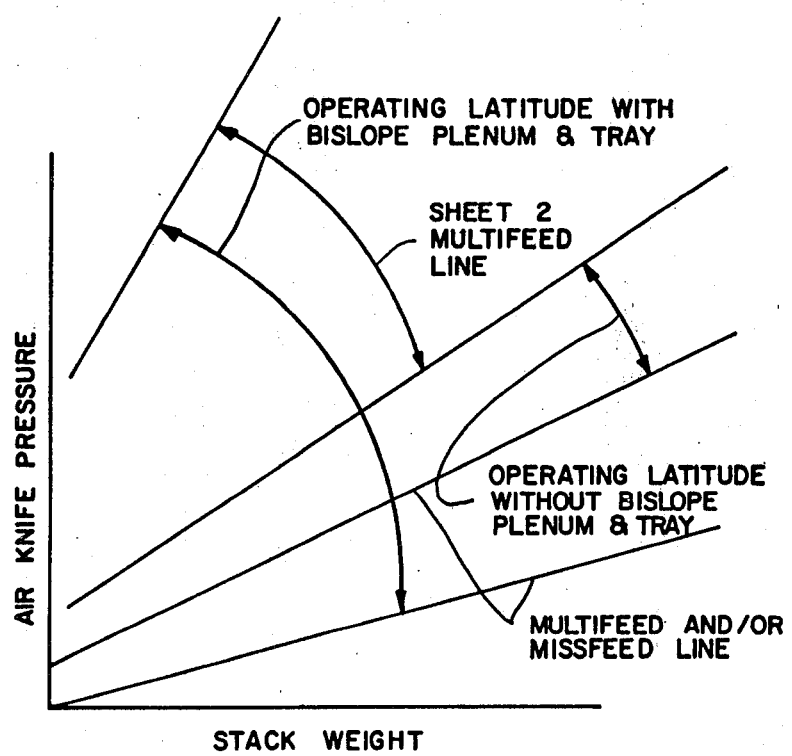
FIG. 7 is a graphical representation of the improved operating latitude achieved with a preferred embodiment of the present invention.

This arrangement of a bisloped vacuum plenum chamber and belt transport assembly together with the sheet stacking tray having sloping planar side wings and transition wings in a "dragon wing" configuration provides both a much better separation of the bottommost sheet from the stack and the virtual elimination of multifeed from flutter of the second sheet. With reference to FIG. 6, this may be simply viewed. The nominal position of the stack of sheets is determined by the corrugation substantially parallel to the feeding direction placed in the stack by the configuration of the tray as well as the air pressure from the air knife which tends to keep the lead edge of the stack supported. The angle formed by the front of the plenum relative to the nominal position of the stack ensures a positive angle of attack of the air stream relative to sheet two and is the characteristic which aids in eliminating sheet two flutter and thereby sheet two multifeed. The angle of the front plenum relative to the rear plenum is the angle which physically cause the bottommost sheet to be separated from the stack by being pulled down onto the transport by the vacuum. This provides a dramatically greater operating window between stack weight and air knife pressure for the system to operate. This can be illustrated by reference to FIG. 7 where the operating latitude is generally depicted. As may be observed with the bislope plenum and belt transport assembly the operating latitude of air knife pressure and sheet stack weight is dramatically increased.

In operation a stack of sheets is placed in the sheet stacking tray and the following sequence of events occurs. The air knife is activated and is on continuously. The vacuum plenum is activated which tends to pull the bottommost sheet down onto the plenum. At the same time, the bottommost sheet tends to separate slightly from the remainder of the stack of sheets, particularly at the front edge due to the downward sloping configuration of the forward end of the vacuum plenum. The air knife is activated to inject pressurized air into the pocket formed between the first sheet and the remainder of the stack and thereby levitate the remainder of the stack facilitating separation of the bottommost sheet from the stack. The feed belt assembly is activated, driving the bottommost sheet from beneath the stack in a forward direction. As the leading edge of the bottommost sheet enters the take-away rolls, the vacuum plenum is turned off and for each successive sheet being fed the cycle is repeated.

As will be appreciated from the above description of the invention a much more efficient sheet separating and feeding apparatus is provided. In particular, a greater deformation of the bottommost sheet onto the stacking tray is provided to increase the efficiency of sheet acquisition and a much better seal is achieved between the bottommost sheet and the remainder of the stack of sheets to prevent less air from escaping. Essentially, all the advantages are hinged on the increase in efficiency of the air supply systems to the sheet separator and feeder and on the greatly increased operating latitude for the air supply values. For example, with a more efficient system a much smaller air blower for the air knife can be used which is much quieter and which also can levitate for the same amount of air a higher stack of sheets. In addition, since the geometric design of the tray does not distinguish between different weights of paper, a greater range of paper weights and sizes may be used. With regard to different sizes of paper, it should be noted that the pocket that is formed tends to take the size of the stack of paper rather than in the prior art, taking the size and the shape of the parabolic pocket. Furthermore, the system has greater reliability since it is not dependent upon the stiffness of paper and its resistance to buckling but rather is geometrically deformed without buckling. A principal advantage in the efficiency of the present invention is that the geometric shape of the tray permits a close contact between the bottommost sheet in the tray over its whole area thereby permitting an air bearing to be established at this interface due to permeation of air from the pocket through the porous sheets. This bearing makes it much easier to drive the sheet out which reduces the vacuum pressure and power required and the noise generated.

It will be appreciated that the described device may be modified and varied by the skilled artisan upon a reading of the present disclosure. For example, while the present invention has been described with reference to a document handler in an automatic copying machine it has application in principle to any sheet feeding device. Similarly, while the present invention has been described with reference to a bottom sheet feeding device which comprises a vacuum corrugated feeder, it is contemplated that the sheet stacking tray of the present invention could be used with a roll or belt retard feeding device. This modification together with other modifications as may readily occur to the artisan are intended to be within the scope of the present invention.

I claim:

1. A bottom sheet feeding apparatus for separating the bottommost sheet in a stack of sheets and feeding it in a forward direction comprising a bottom sheet separator feeder and a sheet stacking tray having a planar base portion defining a base plane, the front of said base portion having an opening within which said bottom sheet separator feeder may be positioned to feed the bottommost sheet of a stack of sheets when sheets are in said sheet stacking tray, said sheet stacking tray further comprising two sloping planar side wings, one at each side of said opening in said base portion, said sloping planar side wings being angled upward from the base plane and being angled outward from front to rear of said tray, and each sloping planar side wing intersecting said base plane along a line from a point of the rear of the base in the approximate location of the rear corners of a rectangle the size of a sheet to be fed to a point at the front of the tray approximately midway between the front corners of a sheet to be fed and the centerline of a sheet to be fed.

2. The bottom sheet feeding apparatus of claim 1 wherein said separator feeder comprises a vacuum friction feed means positioned in about the same plane as the base plane.

3. The bottom sheet feeding apparatus of claim 1 wherein said base plane and said sloping planar side wings are oriented such that they provide a surface which geometrically develops a sheet by bending without buckling and thereby forms a seal around the two sides and rear of the tray between the bottommost sheet of a stack and the rest of a stack of sheets when sheets are in the tray.

4. The bottom sheet feeding apparatus of claim 1 wherein the intersections among said planar base portion and said planar sloping side wings are rounded by a radius.

5. The bottom sheet feeding apparatus of claim 2 wherein said vacuum friction feed means in said tray opening comprises a plurality of vacuum feed belts having a vacuum plenum disposed within the run of the belts, said belts being positioned such that they lie in the plane of the base plane.

6. The bottom sheet feeding apparatus of claim 5 wherein said vacuum plenum has a raised portion positioned in its center to provide a center corrugation member parallel to the sheet feeding direction.

7. The bottom sheet feeding apparatus of claim 6 wherein said plurality of vacuum feed belts has a plurality of perforations therein for cooperation with openings in the vacuum plenum.

8. The bottom sheet feeding apparatus of claim 1 further including an air injection means disposed adjacent the front of said tray to inject air between the bottom sheet in the stack on the tray and the remainder of the stack.

9. The bottom sheet feeding apparatus of claim 1 wherein at least one of said two sloping planar side wings has two planar portions, the first planar portion being connected to and intersecting the base plane at a given angle and the second planar portion being connected to and intersecting the first planar portion the angle formed between the base plane and the second plane portion being smaller than said given angle.

10. The bottom sheet feeding apparatus of claim 1 wherein said tray is vertically inclined upward from rear to front.

11. The bottom sheet feeding apparatus of claim 1 wherein said planar side wings are positioned at an angle of from about 3 degrees to about 6 degrees relative to the base plane.

* * * * *